US012738969B2

(12) United States Patent
Deguchi

(10) Patent No.: US 12,738,969 B2

(45) Date of Patent: Sep. 15, 2026

(54) RADIO-FREQUENCY MODULE AND COMMUNICATION DEVICE

(71) Applicant: Murata Manufacturing Co., Ltd., Nagaokakyo (JP)

(72) Inventor: Hiroki Deguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 400 days.

(21) Appl. No.: 18/487,905

(22) Filed: Oct. 16, 2023

(65) Prior Publication Data

US 2024/0080061 A1 Mar. 7, 2024

Related U.S. Application Data

(63) Continuation of application No. PCT/JP2022/011853, filed on Mar. 16, 2022.

(30) Foreign Application Priority Data

Apr. 16, 2021 (JP) ................................ 2021-069833

(51) Int. Cl.
*H04B 1/40* (2015.01)
*H01Q 1/38* (2006.01)

(52) U.S. Cl.
CPC ................ *H04B 1/40* (2013.01); *H01Q 1/38* (2013.01)

(58) Field of Classification Search
CPC ... H04B 1/40; H04B 1/00; H04B 1/38; H01Q 1/38; H01L 23/12; H01L 25/04; H01L 25/18; H05K 1/18; H05K 3/28; H05K 3/46
See application file for complete search history.

(56) References Cited

U.S. PATENT DOCUMENTS 12,336,196 B2 * 6/2025 Bharath ................... H10D 1/20
12,374,611 B2 * 7/2025 Chen ................... H01L 23/5383
2009/0284328 A1 * 11/2009 Wiesbauer ............. H01P 1/213 333/175

(Continued)

FOREIGN PATENT DOCUMENTS

JP 2001-244638 A 9/2001
JP 2002-170918 A 6/2002

(Continued)

OTHER PUBLICATIONS

International Search Report and Written Opinion mailed on Jun. 14, 2022, received for PCT Application PCT/JP2022/011853, filed on Mar. 16, 2022, 20 pages including English Translation.

*Primary Examiner* — Dhaval V Patel

(74) *Attorney, Agent, or Firm* — XSENSUS LLP

(57) ABSTRACT

A radio-frequency module includes a mounting board, an electronic component and an external connection terminal, a resin layer, and an insulating layer. The electronic component and the external connection terminal are disposed at a second major surface of the mounting board. The insulating layer is harder than the resin layer. A third major surface of the electronic components is located between a fourth major surface of the electronic component and the second major surface. The insulating layer is disposed over the fourth major surface of the electronic component or over both the fourth major surface of the electronic component and the resin layer.

19 Claims, 7 Drawing Sheets

(56) References Cited

U.S. PATENT DOCUMENTS

| | | | | | |
|---|---|---|---|---|---|
| 2014/0312498 | A1* | 10/2014 | Sugiyama | H01L 23/15 | |
| | | | | 257/741 | |
| 2017/0103946 | A1* | 4/2017 | Chang | H01L 23/5227 | |
| 2017/0243854 | A1* | 8/2017 | Sugiyama | H01L 23/5387 | |
| 2020/0035592 | A1* | 1/2020 | Honda | H01L 23/66 | |
| 2020/0098506 | A1* | 3/2020 | Hamada | H01F 27/32 | |
| 2020/0373890 | A1* | 11/2020 | Tokuda | H04B 1/18 | |
| 2020/0373949 | A1* | 11/2020 | Hisano | H03H 7/0115 | |
| 2021/0045242 | A1* | 2/2021 | Tanaka | H05K 3/4682 | |

FOREIGN PATENT DOCUMENTS

| | | | | |
|---|---|---|---|---|
| JP | 2003-051573 A | 2/2003 | | |
| JP | 2005-210074 A | 8/2005 | | |
| JP | 2006-086296 A | 3/2006 | | |
| WO | 2014/017159 A1 | 1/2014 | | |
| WO | WO-2019054154 A1 * | 3/2019 | H04B 1/48 | |
| WO | 2019/216300 A1 | 11/2019 | | |
| WO | 2021/006023 A1 | 1/2021 | | |

* cited by examiner

RADIO-FREQUENCY MODULE AND COMMUNICATION DEVICE

CROSS-REFERENCE TO RELATED APPLICATIONS

This application is a continuation of international application no. PCT/JP2022/011853, filed Mar. 16, 2022, and which claims priority to Japanese application no. 2021-069833, filed Apr. 16, 2021. The entire contents of both prior applications are hereby incorporated by reference.

TECHNICAL FIELD

The present disclosure generally relates to radio-frequency modules and communication devices, and to a radio-frequency module including a mounting board, and a communication device.

BACKGROUND ART

Radio-frequency modules having electronic components on both surfaces of their mounting boards have been known for some time.

The radio-frequency module includes a mounting board, a first radio-frequency component (an electronic component), and an external connection electrode. The mounting board has a first major surface and a second major surface that are opposite to each other. The first radio-frequency component is provided at the second major surface of the mounting board. The external connection electrode is provided at the second major surface. The first radio-frequency component has a third major surface and a fourth major surface that are opposite to each other.

CITATION LIST

Patent Document

Patent Document 1: International Publication No. 2021/006023

SUMMARY

Technical Problem

If heat is applied to the mounting board of the radio-frequency module described above during the manufacturing process or while the radio-frequency module is in use, the mounting board can become bent. As a result, stress can in turn be applied to the first radio-frequency component (an electronic component) disposed on the major surface (the second major surface) of the mounting board, resulting in characteristic degradation.

The present disclosure has been made in consideration of the above problem, and provides a radio-frequency module and a communication device in which stress applied to electronic components disposed at a major surface can be eased, and the probability of characteristic degradation can be lowered.

Solution to Problem

A radio-frequency module according to an aspect of the present disclosure includes a mounting board, an electronic component and an external connection terminal, a resin layer, and an insulating layer. The mounting board has a first major surface and a second major surface that are opposite to each other. The electronic component and the external connection terminal are disposed at the second major surface of the mounting board. The resin layer at least partially covers the electronic component. The electronic component has a third major surface and a fourth major surface that are opposite to each other. The third major surface of the electronic component is located between the fourth major surface of the electronic component and the second major surface of the mounting board. The insulating layer is harder than the resin layer. The insulating layer is disposed over the fourth major surface of the electronic component or disposed over both the fourth major surface of the electronic component and the resin layer.

A radio-frequency module according to an aspect of the present disclosure includes a mounting board, an electronic component and an external connection terminal, a resin layer, and an insulating layer. The mounting board has a first major surface and a second major surface that are opposite to each other. The electronic component and the external connection terminal are disposed at the second major surface of the mounting board. The resin layer at least partially covers the electronic component. The electronic component has a third major surface and a fourth major surface that are opposite to each other. The third major surface of the electronic component is located between the fourth major surface of the electronic component and the second major surface of the mounting board. The material of the insulating layer includes at least one selected from silicon carbide, silicon dioxide, silicon nitride, and silicon oxynitride. The insulating layer is disposed over the fourth major surface of the electronic component or disposed over both the fourth major surface of the electronic component and the resin layer.

A communication device according to an aspect of the present disclosure includes the radio-frequency module according to any of the above aspects and a signal processing circuit. The signal processing circuit is configured to process a radio-frequency signal transferred or to be transferred through the radio-frequency module.

Advantageous Effects

The radio-frequency module and the communication device according to the above configurations of the present disclosure can ease stress applied to electronic components disposed at a major surface and lower the probability of characteristic degradation.

DETAILED DESCRIPTION

Figure 1:
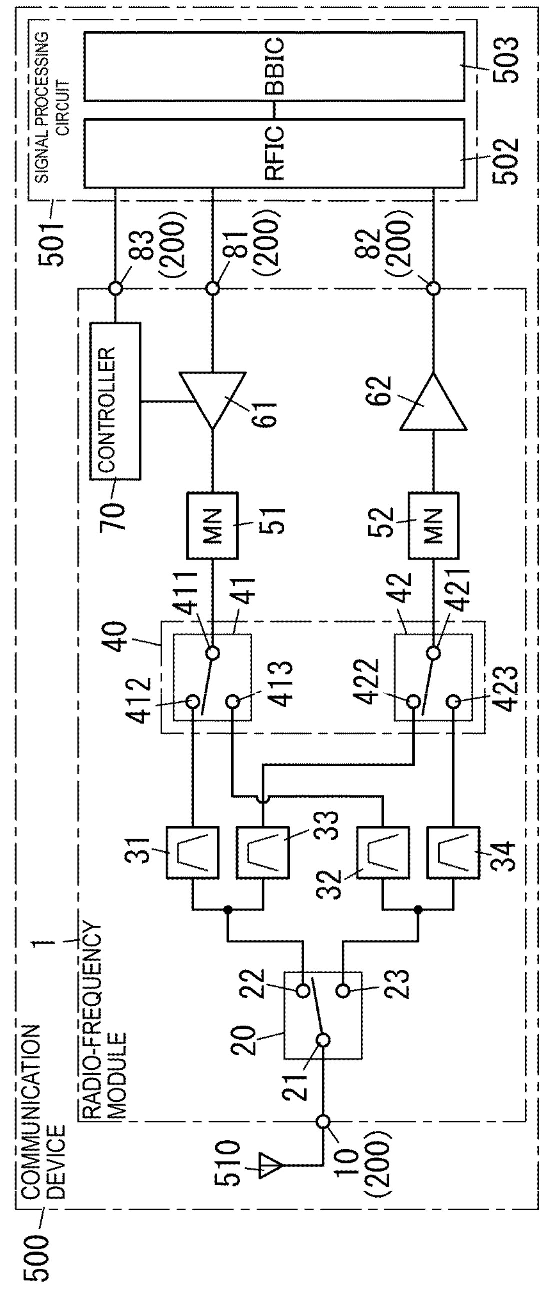
FIG. 1 is a circuit diagram illustrating a configuration of a communication device including a radio-frequency module according to an exemplary embodiment.

FIGS. 2 to 10, which will be referred to in the following exemplary embodiment and modifications, are all schematic drawings, and the proportion of size and thickness of each constituent element in the drawings is not necessarily identical to the corresponding proportion in actual measurements.

Embodiment

Figure 2:
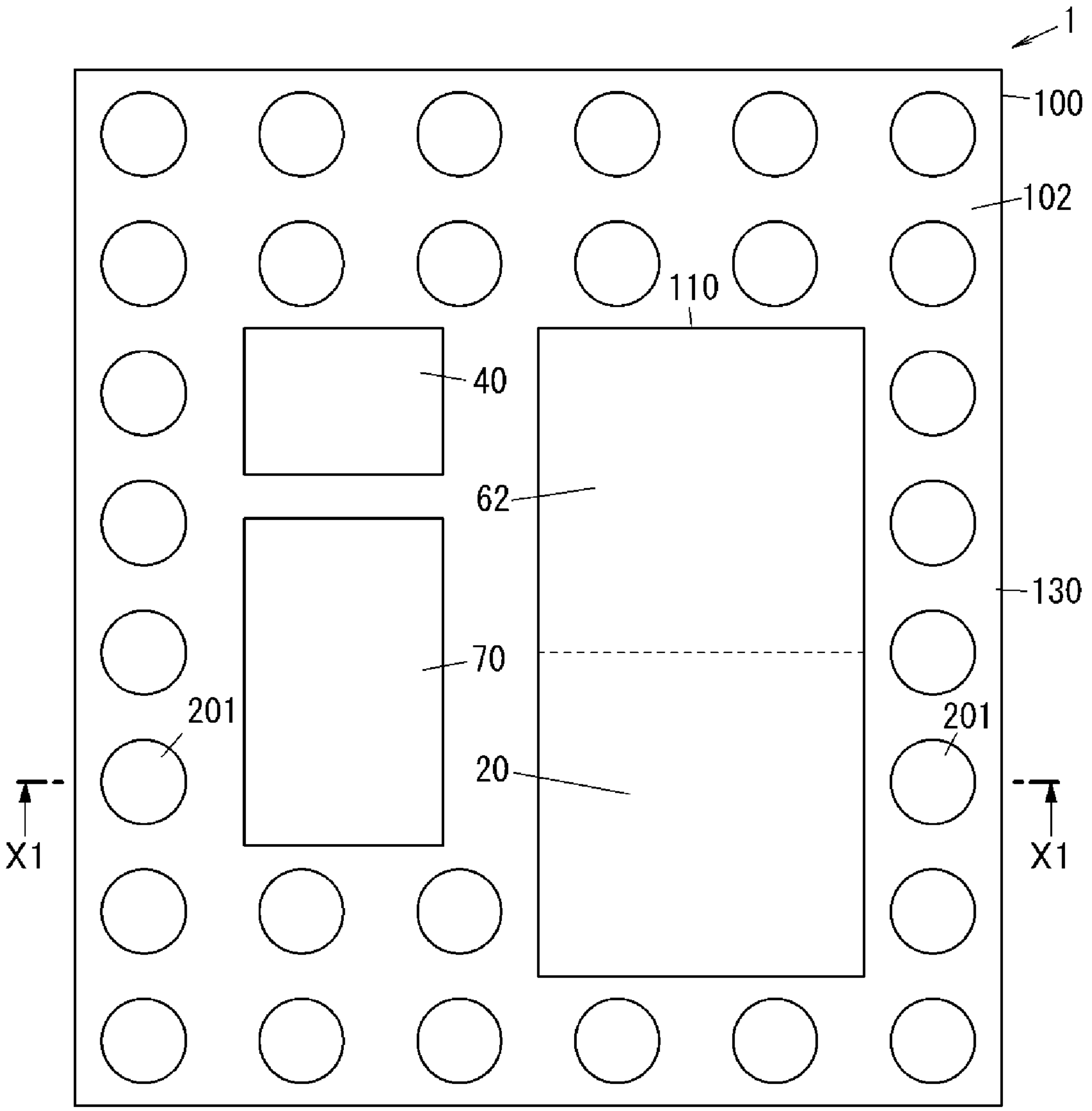
FIG. 2 is a cutaway plan view of electronic components arranged at a second major surface of a mounting board included in the radio-frequency module, when viewed from the first major surface side of the mounting board.
Figure 3:
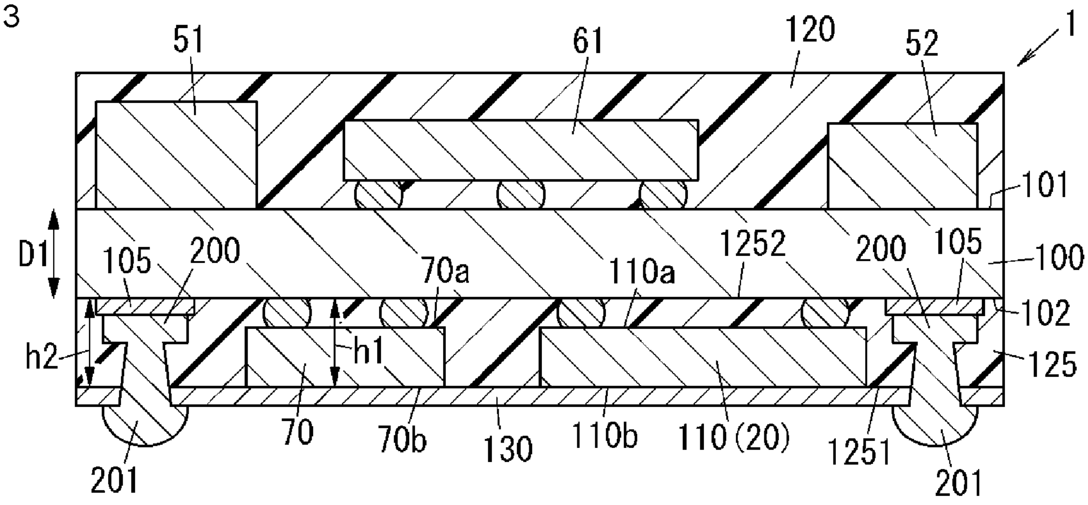
FIG. 3 is a sectional view of the radio-frequency module, taken along line X1-X1 in FIG. 2.
Figure 4:
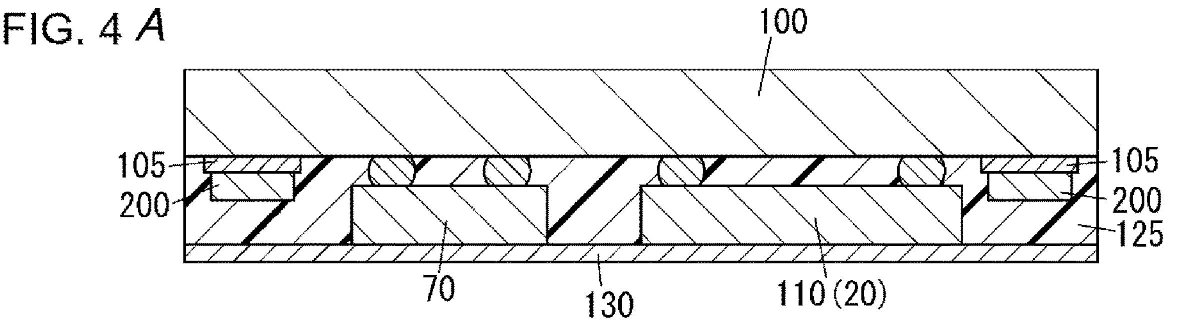
FIG. 4A is a sectional view of the radio-frequency module in a step of a manufacturing process.
FIG. 4B is a sectional view of the radio-frequency module in another step of the manufacturing process.
FIG. 4C is a sectional view of the radio-frequency module in a further step of the manufacturing process.
Figure 4:
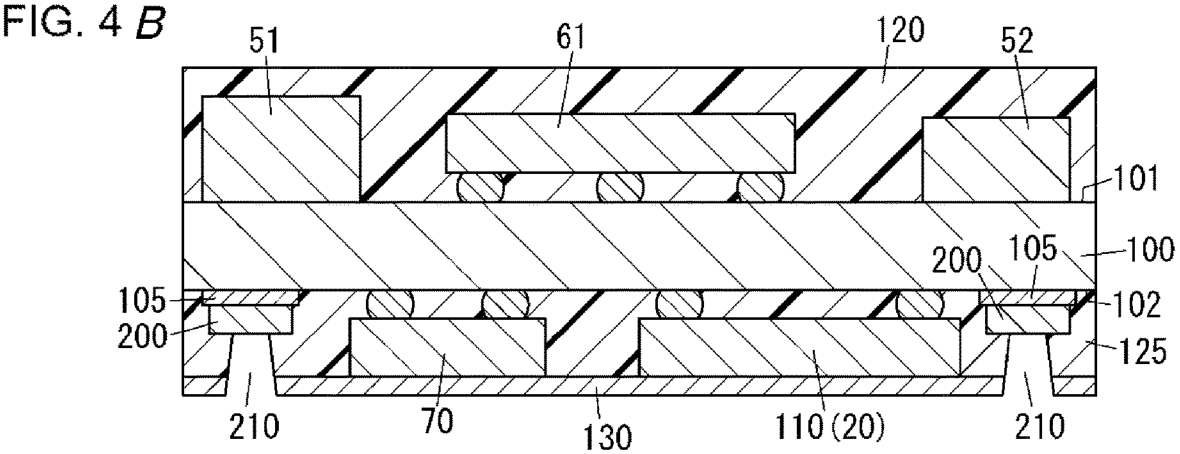
Figure 4:
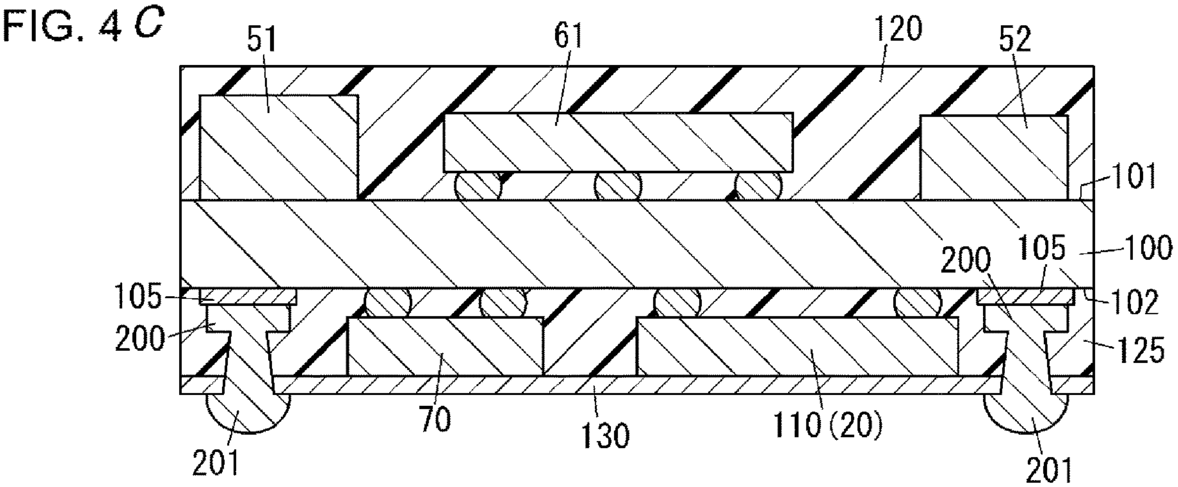

The following describes a radio-frequency module 1 according to an exemplary embodiment with reference to FIGS. 1 to 3.

(1) Outline

The radio-frequency module 1 according to the exemplary embodiment includes, as illustrated in FIGS. 1 to 3, a mounting board 100, electronic components and external connection terminals 200, a resin layer (a second resin layer 125, which will be described later), and an insulating layer 130. The mounting board 100 has a first major surface 101 and a second major surface 102 that are opposite to each other in a thickness direction D1 of the mounting board 100. The electronic components and the external connection terminals 200 are disposed at the second major surface 102 of the mounting board 100. The electronic components include a first switch 20, a second switch 40, a low-noise amplifier 62, and a controller 70, which are illustrated in FIGS. 1 and 2. The resin layer is disposed on the second major surface 102 of the mounting board 100. The insulating layer is harder than the resin layer. Each electronic component (for example, the controller 70) has a third major surface (for example, a major surface 70*a* of the controller) and a fourth major surface (for example, a major surface 70*b* of the controller) that are opposite to each other. The third major surface of the electronic components is located between the fourth major surfaces of the electronic components and the second major surface 102 of the mounting board 100. The insulating layer 130 is disposed over the fourth major surfaces of the electronic components or over both the fourth major surfaces of the electronic components and the resin layer.

As used herein, the expression "A is disposed at the second major surface 102 of the mounting board 100" means that A is mounted directly on the second major surface 102 and also means that considering the space on the second major surface 102 side and the space on the first major surface 101 side that are separated by the mounting board 100, A is disposed in the space on the second major surface 102 side. Specifically, the expression includes the case in which A is disposed on the second major surface 102 with other circuit elements and electrodes that are interposed between A and the second major surface 102. In other words, the expression "A is disposed at the second major surface 102 of the mounting board 100" includes the following cases: A is mounted in contact with a major surface (for example, the second major surface 102) of the mounting board 100; A is disposed above the major surface in no contact with the major surface; and a portion of A is embedded in the board at the major surface.

The radio-frequency module 1 according to the exemplary embodiment is usable in a multi-mode/multi-band communication device 500 as an example. The communication device 500 may be, for example, a mobile phone (for example, a smartphone). The communication device 500 is not limited to this example and may be, for example, a wearable device (for example, a smartwatch). The radio-frequency module 1 can support technology standards such as the fourth generation (4G) and fifth generation (5G) technology standards for cellular networks. Examples of the 4G standards include the 3rd Generation Partnership Project (3GPP) Long-Term Evolution (LTE) standard. Examples of the 5G standards include 5G New Radio (NR).

(2) Configuration

The following describes a configuration of the radio-frequency module 1 according to the exemplary embodiment and the communication device 500 with reference to FIGS. 1 to 3.

The radio-frequency module 1 is configured to, for example, amplify a transmit signal (a radio-frequency signal) inputted from a signal processing circuit 501 (see FIG. 1) and output the transmit signal to an antenna 510. The radio-frequency module 1 is configured to, for example, amplify a receive signal (a radio-frequency signal) inputted from the antenna 510 and outputs the receive signal to a signal processing circuit 501. The signal processing circuit 501 is not a constituent element of the radio-frequency module 1; the signal processing circuit 501 is a constituent element of the communication device 500 including the radio-frequency module 1. The radio-frequency module 1 is controllable by, for example, the signal processing circuit 501 included in the communication device 500. The communication device 500 includes the radio-frequency module 1 and the signal processing circuit 501. The communication device 500 further includes the antenna 510. The communication device 500 further includes a circuit board having the radio-frequency module 1. The circuit board is, for example, a printed-circuit board. The circuit board has a ground electrode to which a ground potential is supplied.

The antenna 510 is coupled to an antenna terminal 10 of the radio-frequency module 1. The antenna 510 has a transmit function of sending as radio waves transmit signals outputted from the radio-frequency module 1 and a receive function of receiving receive signals as radio waves from outside and outputting the receive signals to the radio-frequency module 1.

The signal processing circuit 501 processes a signal (for example, a receive signal, a transmit signal) transferred or to be transferred through the radio-frequency module 1. The signal processing circuit 501 includes, for example, a radio-frequency (RF) signal processing circuit 502 and a baseband signal processing circuit 503. The RF signal processing circuit 502 is, for example, a radio frequency integrated circuit (RFIC) and processes radio-frequency signals. The RF signal processing circuit 502 processes by, for example, up-conversion a radio-frequency signal (transmit signal) outputted by the baseband signal processing circuit 503 and outputs the processed radio-frequency signal. The RF signal processing circuit 502 also processes by, for example, down-conversion a radio-frequency signal (receive signal) outputted by the radio-frequency module 1 and outputs the processed radio-frequency signal to the baseband signal processing circuit 503.

The baseband signal processing circuit 503 is, for example, a baseband integrated circuit (BBIC). The baseband signal processing circuit 503 generates an in-phase signal and a quadrature signal from a baseband signal. The baseband signal is, for example, a sound signal or image signal inputted from outside. The baseband signal processing circuit 503 performs IQ modulation by adding an in-phase signal and a quadrature signal together and outputs a transmit signal. At this time, the transmit signal is a modulated signal (IQ signal) generated by amplitude modulating a carrier wave signal of a given frequency by a period longer than the period of the carrier wave signal. The receive signal processed by the baseband signal processing circuit 503 is used as, for example, an image signal for image display or a sound signal for calls. The radio-frequency module 1 according to the exemplary embodiment transfers a radio-frequency signal (a receive signal) between the antenna 510 and the RF signal processing circuit 502 of the signal processing circuit 501.

The radio-frequency module 1 includes, as illustrated in FIG. 1, the antenna terminal 10, the first switch 20, a first transmit filter 31, a second transmit filter 32, a first receive filter 33, a second receive filter 34, the second switch 40, a first matching circuit 51, a second matching circuit 52, a power amplifier 61, the low-noise amplifier 62, and the controller 70. The radio-frequency module 1 further includes a signal input terminal 81, a signal output terminal 82, and control terminals 83. The first switch 20 and the low-noise amplifier 62 are integrated into one chip, which is a switch integrated circuit (IC) 110 (see FIG. 2).

The antenna terminal 10 is electrically coupled to the antenna 510. As used herein, the expression "A is coupled to B" includes the case in which A and B are in contact with each other and also includes the case in which A and B are electrically connected to each other via, for example, a conductive electrode, a conductive terminal, an interconnection, or another circuit component. The expression "coupled between A and B" means that a circuit element is coupled to both A and B while the circuit element is positioned between A and B.

The first switch 20 is configured to connect the first transmit filter 31, the second transmit filter 32, the first receive filter 33, and the second receive filter 34 to the antenna 510. The first switch 20 is operable to concurrently connect the first transmit filter 31 and the second transmit filter 32 to the antenna 510. The first switch 20 is also operable to concurrently connect the first receive filter 33 and the second receive filter 34 to the antenna 510. This means that the radio-frequency module 1 supports carrier aggregation and dual connectivity. Carrier aggregation and dual connectivity mean communications that simultaneously use radio waves in multiple frequency bands. In the following, signal transmission by carrier aggregation or dual connectivity is also referred to as concurrent transmission when necessary.

The first switch 20 has a common terminal 21 and multiple (for example, two) selection terminals 22 and 23. Of the first switch 20, the common terminal 21 is coupled to the antenna terminal 10. The radio-frequency module 1 is not necessarily configured such that the common terminal 21 is coupled to the antenna terminal 10 via no circuit element; the common terminal 21 may be coupled to the antenna terminal 10 via, for example, a low pass filter and a coupler. The selection terminal 22 is coupled to a node between an output terminal of the first transmit filter 31 and the input terminal of the first receive filter 33. The selection terminal 23 is coupled to a node between an output terminal of the second transmit filter 32 and an input terminal of the second receive filter 34. The first switch 20 is a switch configured to connect, for example, at least one of the two selection terminals 22 and 23 to the common terminal 21. The first switch 20 is a switch configured to establish connection, for example, between one terminal and one terminal and between one terminal and multiple terminals.

The first switch 20 is controllable by, for example, the signal processing circuit 501. Based on a control signal from the RF signal processing circuit 502 of the signal processing circuit 501, the first switch 20 switches connections between the common terminal 21 and the three selection terminals 22 to 23. The first switch 20 is, for example, a switch integrated circuit (IC).

The first transmit filter 31 and the second transmit filter 32 are transmit filters having pass bands of different frequency bands. The first transmit filter 31 is a filter having a pass band corresponding to a transmit band of, for example, a first communication band. The second transmit filter 32 is a filter having a pass band corresponding to a transmit band of, for example, the second communication band. The first communication band corresponds to transmit signals that can be passed by the first transmit filter 31. The second communication band corresponds to transmit signals that can be passed by the second transmit filter 32. The first communication band and the second communication band are communication bands of, for example, the 3GPP LTE standard or the 5G NR standard.

The first transmit filter 31 and the second transmit filter 32 are, for example, ladder filters each including multiple (for example, four) series arm resonators and multiple (for example, three) parallel arm resonators. The first transmit filter 31 and the second transmit filter 32 are, for example, acoustic wave filters. In the acoustic wave filter, multiple series arm resonators and multiple parallel arm resonators are formed by acoustic wave resonators. The acoustic wave filter is, for example, a surface acoustic wave filter using surface acoustic waves. In the surface acoustic wave filter, the plurality of series arm resonators and the plurality of parallel arm resonators are, for example, surface acoustic wave (SAW) resonators. The first transmit filter 31 and the second transmit filter 32 are not limited to SAW filters. The first transmit filter 31 and the second transmit filter 32 may be filters other than SAW filters, such as bulk acoustic wave (BAW) filters. A resonator in the BAW filter is, for example, a film bulk acoustic resonator (FBAR) or solidly mounted resonator (SMR). The BAW filter includes a substrate. The substrate included in the BAW filter is, for example, a silicon substrate.

The first receive filter 33 and the second receive filter 34 are receive filters having pass bands of different frequency bands. The first receive filter 33 is a filter having a pass band corresponding to a receive band of, for example, the first communication band. The second receive filter 34 is a filter having a pass band corresponding to a receive band of, for example, the second communication band. The first communication band corresponds to receive signals that can be passed by the first receive filter 33. The second communication band corresponds to receive signals that can be passed by the second receive filter 34.

The first receive filter 33 and the second receive filter 34 are, for example, ladder filters each including multiple (for example, four) series arm resonators and multiple (for example, three) parallel arm resonators. The first receive filter 33 and the second receive filter 34 are, for example, acoustic wave filters. In the acoustic wave filter, multiple series arm resonators and multiple parallel arm resonators are formed by acoustic wave resonators. The acoustic wave filter is, for example, a surface acoustic wave filter using surface acoustic waves. In the surface acoustic wave filter, the multiple arm resonators and the multiple parallel arm resonators are, for example, SAW resonators. The first receive filter 33 and the second receive filter 34 are not limited to SAW filters. The first receive filter 33 and the second receive filter 34 may be filters other than SAW filters, such as BAW filters.

In the radio-frequency module 1, the first transmit filter 31 and the first receive filter 33 may be implemented by duplexers. The second transmit filter 32 and the second receive filter 34 may be implemented by duplexers.

The second switch 40 is a switch IC formed as one chip including a third switch 41 and a fourth switch 42.

The third switch 41 has a common terminal 411 and multiple (for example, two) selection terminals 412 and 413. Of the third switch 41, the common terminal 411 is coupled to an output terminal of the power amplifier 61 via the first matching circuit 51. The common terminal 411 is coupled to an input terminal of the first transmit filter 31. The selection terminal 412 is coupled to an input terminal of the second transmit filter 32. The third switch 41 is a switch configured to connect, for example, at least one of the two selection terminals 412 and 413 to the common terminal 411. The third switch 41 is a switch configured to establish connection, for example, between one terminal and one terminal and between one terminal and multiple terminals.

The third switch 41 is controllable by, for example, the signal processing circuit 501. Based on a control signal from the RF signal processing circuit 502 of the signal processing circuit 501, the third switch 41 switches connections between the common terminal 411 and the two selection terminals 412 and 413.

The fourth switch 42 has a common terminal 421 and multiple (for example, two) selection terminals 422 and 423. Of the fourth switch 42, the common terminal 411 is coupled to an input terminal of the low-noise amplifier 62 via the second matching circuit 52. The common terminal 421 is coupled to an input terminal of the first receive filter 33. The selection terminal 423 is coupled to an output terminal of the second receive filter 34. The fourth switch 42 is a switch configured to connect, for example, at least one of the two selection terminals 422 and 423 to the common terminal 421. The fourth switch 42 is a switch configured to establish connection, for example, between one terminal and one terminal and between one terminal and multiple terminals.

The fourth switch 42 is controllable by, for example, the signal processing circuit 501. Based on a control signal from the RF signal processing circuit 502 of the signal processing circuit 501, the fourth switch 42 switches connections between the common terminal 421 and the two selection terminals 422 and 423.

The first matching circuit 51 is provided in a signal path between the output terminal of the power amplifier 61 and the common terminal 411 of the third switch 41. The first matching circuit 51 is operable to provide impedance matching between the power amplifier 61 and the third switch 41. In other words, the first matching circuit 51 is operable to provide impedance matching between the power amplifier 61, and the first transmit filter 31 and the second transmit filter 32. The first matching circuit 51 includes multiple inductors. In addition to multiple inductors, the first matching circuit 51 may include, for example, one or multiple capacitors. The first matching circuit 51 is not limited to a configuration including multiple inductors; the first matching circuit 51 may have a configuration including, for example, only one inductor.

The second matching circuit 52 is provided in a signal path between the input terminal of the low-noise amplifier 62 and the common terminal 421 of the fourth switch 42. The second matching circuit 52 is operable to provide impedance matching between the low-noise amplifier 62 and the fourth switch 42. In other words, the second matching circuit 52 is operable to provide impedance matching between the low-noise amplifier 62, and the first receive filter 33 and the second receive filter 34. The second matching circuit 52 includes multiple inductors. In addition to multiple inductors, the second matching circuit 52 may include, for example, one or multiple capacitors. The second matching circuit 52 is not limited to a configuration including multiple inductors; the first matching circuit 51 may have a configuration including, for example, only one inductor.

The power amplifier 61 has an input terminal and an output terminal. The power amplifier 61 is operable to amplify a transmit signal inputted to the input terminal and output the transmit signal from the output terminal. The input terminal of the power amplifier 61 is coupled to the signal input terminal 81. The input terminal of the power amplifier 61 is coupled to the signal processing circuit 501 via the signal input terminal 81. The signal input terminal 81 is a terminal for inputting a radio-frequency signal (a transmit signal) from an external circuit (for example, the signal processing circuit 501) to the radio-frequency module 1. In the radio-frequency module 1, the output terminal of the power amplifier 61 is coupleable to the first transmit filter 31 and the second transmit filter 32 via the first matching circuit 51 and the third switch 41. In the radio-frequency module 1, the output terminal of the power amplifier 61 is coupled to the common terminal 411 of the third switch 41 via the first matching circuit 51, and the two selection terminals 412 and 413 of the third switch 41 are respectively coupled to the first transmit filter 31 and the second transmit filter 32 in one-to-one correspondence. The power amplifier 61 is controllable by the controller 70.

The low-noise amplifier 62 has an input terminal and an output terminal. The low-noise amplifier 62 is operable to amplify a transmit signal inputted to the input terminal and outputs the transmit signal from the output terminal. The input terminal of the low-noise amplifier 62 is coupled to the common terminal 421 of the fourth switch 42 via the second matching circuit 52. The output terminal of the low-noise amplifier 62 is coupled to the signal output terminal 82. The output terminal of the low-noise amplifier 62 is coupled to, for example, the signal processing circuit 501 via the signal output terminal 82. The signal output terminal 82 is a terminal for outputting a radio-frequency signal (a receive signal) from the low-noise amplifier 62 to an external circuit (for example, the signal processing circuit 501). In the radio-frequency module 1, the input terminal of the low-noise amplifier 62 is coupleable to the first receive filter 33 and the second receive filter 34 via the second matching circuit 52 and the fourth switch 42. In the radio-frequency module 1, the input terminal of the low-noise amplifier 62 is coupled to the common terminal 421 of the fourth switch 42 via the second matching circuit 52, the two selection terminals 422 and 423 of the fourth switch 42 are respectively coupled to the first receive filter 33 and the second receive filter 34 in one-to-one correspondence.

The controller 70 is operable to control the power amplifier 61 based on, for example, a control signal from the signal processing circuit 501. The controller 70 is coupled to the signal processing circuit 501 via the multiple (for example, four) control terminals 83. The control terminals 83 are terminals for inputting a control signal from an external circuit (for example, the signal processing circuit 501) to the controller 70. Based on the control signal obtained via the control terminals 83, the controller 70 controls the power amplifier 61. The control signal obtained by the controller 70 via the control terminals 83 is a digital signal. The number of control terminals 83 is, for example, four, but FIG. 1 illustrates only one control terminal 83.

The signal input terminal 81, the signal output terminal 82, and the control terminals 83 are coupled to the RF signal processing circuit 502. This means that the power amplifier 61 is electrically coupled to the RF signal processing circuit 502 via the signal input terminal 81. The low-noise amplifier 62 is electrically coupled to the RF signal processing circuit 502 via the signal output terminal 82. The controller 70 is electrically coupled to the RF signal processing circuit 502 via the control terminals 83.

The radio-frequency module 1 includes, as illustrated in FIGS. 2 and 3, the mounting board 100, a first resin layer 120, a second resin layer 125 (the resin layer), the insulating layer 130, multiple external connection terminals 200, and multiple (two in FIG. 3) metal bumps 201. The metal bumps 201 are, for example, solder bumps. The mounting board 100 has the first major surface 101 and the second major surface 102, which are opposite to each other in the thickness direction D1 of the mounting board 100. In FIG. 2, the second resin layer 125 is not illustrated.

The mounting board 100 may be, for example, a printed-circuit board, low temperature co-fired ceramics (LTCC) substrate, high temperature co-fired ceramics (HTCC) substrate, or resin multilayer substrate. In this example, the mounting board 100, for example, is a multilayer substrate including multiple dielectric layers and multiple conductive layers and is a ceramic substrate. The dielectric layers and the conductive layers are stacked in the thickness direction D1 of the mounting board 100. The conductive layers are shaped in particular patterns designed for the respective conductive layers. The conductive layers each include one or a plurality of conductive portions in one plane perpendicular to the thickness direction D1 of the mounting board 100. The material of the conductive layers is, for example, copper. The conductive layers include a ground layer. In the radio-frequency module 1, one or more ground terminals included in the external connection terminals 200 (see FIG. 3) and the ground layer are electrically coupled to each other via, for example, via-conductors and pads at the mounting board 100.

The mounting board 100 is not limited to a printed-circuit board or LTCC substrate; the mounting board 100 may be an interconnection structure. The interconnection structure is, for example, a multilayer structure. The multilayer structure includes at least one insulating layer and at least one conductive layer. The insulating layer is shaped in a particular pattern. When multiple insulating layers are included, the insulating layers are shaped in particular patterns designed for the respective insulating layers. The conductive layer is shaped in a particular pattern different from the particular pattern of the insulating layer. When multiple conductive layers are included, the conductive layers are shaped in particular patterns designed for the respective conductive layers. The conductive layer may include one or multiple redistribution portions. In the interconnection structure, of two surfaces that are opposite to each other in the thickness direction of the multilayer structure, a first surface is the first major surface 101 of the mounting board 100, and a second surface is the second major surface 102 of the mounting board 100. The interconnection structure may be, for example, an interposer. The interposer may be an interposer made of a silicon substrate, or a substrate composed of multiple layers.

The first major surface 101 and the second major surface 102 of the mounting board 100 are apart from each other in the thickness direction D1 of the mounting board 100. The first major surface 101 and the second major surface 102 of the mounting board 100 cross the thickness direction D1 of the mounting board 100. The first major surface 101 of the mounting board 100 is, for example, perpendicular to the thickness direction D1 of the mounting board 100. However, the first major surface 101 may include, for example, a side surface of a conductive portion as a surface not perpendicular to the thickness direction D1. The second major surface 102 of the mounting board 100 is, for example, perpendicular to the thickness direction D1 of the mounting board 100. However, the second major surface 102 may include, for example, a side surface of a conductive portion as a surface not perpendicular to the thickness direction D1. On the first major surface 101 and the second major surface 102 of the mounting board 100, fine irregularities, or a depressed or raised portion may be formed. When viewed in plan view in the thickness direction D1 of the mounting board 100, the mounting board 100 is rectangular; but this is not to be interpreted as limiting, and the mounting board 100 may be, for example, square. The expression "plan view" refers to the perspective of an object orthogonally projected onto an xy plane, viewed from the positive side of the z axis.

The radio-frequency module 1 includes multiple electronic components. The multiple electronic components includes the first switch 20, the first transmit filter 31, the second transmit filter 32, the first receive filter 33, the second receive filter 34, the second switch 40, the first matching circuit 51, the second matching circuit 52, the power amplifier 61, the low-noise amplifier 62, and the controller 70. When viewed in plan view in the thickness direction D1 of the mounting board 100, the outer shape of each component is quadrangular (rectangular).

The components of the radio-frequency module 1 are individually mounted at the first major surface 101 or the second major surface 102 of the mounting board 100. In the exemplary embodiment, among the electronic components of the radio-frequency module 1, the first switch 20, the second switch 40, the low-noise amplifier 62, and the controller 70 are disposed at the second major surface 102 of the mounting board 100. Among the electronic components of the radio-frequency module 1, the first transmit filter 31, the second transmit filter 32, the first receive filter 33, the second receive filter 34, the first matching circuit 51, the second matching circuit 52, and the power amplifier 61 are disposed at the first major surface 101 of the mounting board 100.

Each of the electronic components disposed at the second major surface 102 of the mounting board 100 has the third major surface and the fourth major surface, which are opposite to each other. The third major surface of the electronic components is located between the fourth major surfaces of the electronic components and the second major surface 102 of the mounting board 100. For example, the major surface 70*a* (the third major surface) of the controller 70 is located between the major surface 70*b* (the fourth major surface) of the controller 70 and the second major surface 102 of the mounting board 100 (see FIG. 3). A major surface 110*a* (the third major surface) of the switch IC 110 including the first switch 20 and the low-noise amplifier 62 is located between a major surface 110*b* (the fourth major surface) of the switch IC 110 and the second major surface 102 of the mounting board 100 (see FIG. 3).

The mounting board 100 includes multiple pads 105. Each pad 105 has a rectangular column shape. The pads 105 are disposed at the second major surface 102.

The first resin layer 120 is provided on the first major surface 101 side with respect to the mounting board 100 such that the electronic components disposed on the first major surface 101 of the mounting board 100 are covered by the first resin layer 120. In this example, the first resin layer 120 seals the electronic components disposed on the first major surface 101 of the mounting board 100. The first resin layer 120 contains a resin (for example, an epoxy resin). The first resin layer 120 may contain a filler as well as a resin.

The second resin layer 125 is disposed on the second major surface 102 of the mounting board 100. The second resin layer 125 is provided on the second major surface 102 side with respect to the mounting board 100 such that the second resin layer 125 at least partially covers the electronic components mounted on the second major surface 102 of the mounting board 100 and also partially covers each external connection terminals 200. The second resin layer 125 contains a resin (for example, an epoxy resin). The second resin layer 125 may contain a filler as well as a resin. The material of the second resin layer 125 may be either the same as or different from the material of the first resin layer 120. The second resin layer 125 has a major surface 1251 (a fifth major surface) and a major surface 1252 that are opposite to each other in the thickness direction of the second resin layer 125 (the thickness direction D1 of the mounting board 100). The major surface 1252 of the second resin layer 125 is coupled to (in contact with) the second major surface 102 of the mounting board 100. This means that the major surface 1251 of the second resin layer 125 is the surface opposite to the mounting board 100 of the second resin layer 125.

The second resin layer 125 is disposed such that the fourth major surfaces of the electronic components mounted at the second major surface 102 of the mounting board 100 are exposed. In the exemplary embodiment, the major surface 70*b* (the fourth major surface) of the controller 70 and the major surface 110*b* (the fourth major surface) of the switch IC 110 are exposed from the second resin layer 125. This means that the height from the second major surface 102 of the mounting board 100 to the fourth major surfaces of the electronic components mounted at the second major surface 102 of the mounting board 100 is the same as a height h2 of the second resin layer 125. For example, a height h1 from the second major surface 102 of the mounting board 100 to the major surface 70*b* (the fourth major surface) of the controller 70 is the same as the height h2 of the second resin layer 125. The height, which is almost the same as the height h1, from the second major surface 102 of the mounting board 100 to the major surface 110*b* (the fourth major surface) of the switch IC 110 is the same as the height h2 of the second resin layer 125. The height h2 of the second resin layer 125 is the height from the second major surface 102 of the mounting board 100 to the major surface 1251 of the second resin layer 125. The thickness of the electronic components (for example, the thickness of the controller 70 or the switch IC 110) is, for example, 40 μm. The height from the second major surface 102 of the mounting board 100 to the fourth major surfaces of the electronic components (for example, the major surface 70*b* of the controller 70 or the switch IC 110) is 100 μm. The expression "the height from the second major surface 102 of the mounting board 100 to the fourth major surfaces of the electronic components is the same as the height h2 of the second resin layer 125" includes the case the height from the second major surface 102 of the mounting board 100 to the fourth major surfaces of the electronic components is exactly the same as the height h2 of the second resin layer 125 and also includes the case with allowable deviations. The allowable deviations is, for example, ±30 μm, and more specifically, ±20 μm.

The insulating layer 130 is disposed over the fourth major surfaces of the electronic components disposed at the second major surface 102 of the mounting board 100 or disposed over both the fourth major surfaces of the electronic components and the major surface 1251 of the second resin layer 125. More specifically, the insulating layer 130 is in contact with (coupled to) the fourth major surfaces of the electronic components; or the insulating layer 130 is in contact with (coupled to) both the fourth major surfaces of the electronic components disposed at the second major surface 102 of the mounting board 100 and the major surface 1251 of the second resin layer 125. The major surface 1251 of the second resin layer 125 is, of the two surfaces of the second resin layer 125, which are opposite to each other in the thickness direction D1 of the mounting board 100, the surface that is away from the mounting board 100. In the exemplary embodiment, the insulating layer 130 is in contact with (coupled to) the fourth major surfaces of the electronic components and the major surface 1251 of the second resin layer 125. The insulating layer 130 extends to the edges of the mounting board 100, that is, the edges of the second resin layer 125.

The thermal electrical conductivity of the insulating layer 130 is higher than the thermal electrical conductivity of the second resin layer 125. The insulating layer 130 is harder than the second resin layer 125. For example, the material of the insulating layer 130 includes at least one selected from silicon carbide (SiC), silicon dioxide ($SiO_2$), silicon nitride ($Si_3N_4$), and silicon oxynitride (SiON). The thickness of the insulating layer 130 is, for example, 4 to 12 μm. More specifically, the thickness of the insulating layer 130 is 10 μm. The metric of "hardness" is, for example, the Vickers hardness. The expression "A is harder than B" means, for example, that the Vickers hardness of A is greater than the Vickers hardness of B.

The external connection terminals 200 are disposed at the second major surface of the mounting board 100. The external connection terminals 200 are columnar electrodes. The material of the external connection terminals 200 is, for example, metal (for example, copper or a copper alloy). The external connection terminals 200 are electrically coupled to the electronic components disposed at the mounting board 100 and the conductive layers of the mounting board 100 via, for example, via-conductors and the pads 105 provided at the mounting board 100. The external connection terminals 200 are individually coupled to the metal bumps 201.

The external connection terminals 200 include the antenna terminal 10, one or more ground terminals, the signal input terminal 81, the signal output terminal 82, and the control terminals 83. The one or more ground terminals are, as described above, coupled to the ground layer of the mounting board 100. The ground layer serves as the circuit ground of the radio-frequency module 1. The electronic components of the radio-frequency module 1 include electronic components coupled to the ground layer.

When viewed in plan view in the thickness direction D1 of the mounting board 100, the external connection terminals 200 overlap the insulating layer 130. As used herein, the expression "when viewed in plan view, A overlaps B" includes the case in which when viewed in plan view, at least a portion of A coincides with at least a portion of B.

The external connection terminals 200 are individually coupled to the metal bumps 201. The insulating layer 130 is in contact with the metal bumps 201.

(3) Manufacturing Method

The following describes a manufacturing method of the radio-frequency module 1 with reference to FIG. 4A to 4C. The manufacturing method of the radio-frequency module 1 includes first to fourth steps.

In the first step, grinding is performed on the electronic components (the controller 70, the switch IC 110, and the second switch 40) disposed at the second major surface 102 of the mounting board 100 and the second resin layer 125.

In the second step, after grinding is completed in the first step, the insulating layer 130 is formed by sputtering (see FIG. 4A).

In the third step, the electronic components including the power amplifier 61 and the first resin layer 120 are disposed at the first major surface 101 of the mounting board 100. In the third step, laser drilling is performed to at least partially expose the external connection terminals 200 from the second resin layer 125 (see FIG. 4B).

In the fourth step, the metal bumps 201 are formed such that the metal bumps 201 fill holes 210 formed by laser drilling and are coupled to the external connection terminals 200 (see FIG. 4C).

(4) Effects

As described above, the radio-frequency module 1 according to the exemplary embodiment includes the mounting board 100, the electronic components (for example, the controller 70, the switch IC 110, and the second switch 40) and the external connection terminals 200, the resin layer (for example, the second resin layer 125), and the insulating layer 130. The mounting board 100 has the first major surface 101 and the second major surface 102 that are opposite to each other. The electronic components and the external connection terminals 200 are disposed at the second major surface 102 of the mounting board 100. The resin layer at least partially covers the electronic components. The electronic components has the third major surface (for example, the major surface 70*a* of the controller 70 and the major surface 110*a* of the switch IC 110) and the fourth major surface (for example, the major surface 70*b* of the controller 70 and the major surface 110*b* of the switch IC 110) that are opposite to each other. The third major surface of the electronic components is located between the fourth major surfaces of the electronic components and the second major surface 102 of the mounting board 100. The insulating layer 130 is harder than the resin layer. The insulating layer 130 is disposed over the fourth major surfaces of the electronic components or over both the fourth major surfaces of the electronic components and the resin layer.

In this configuration, the insulating layer 130 of the radio-frequency module 1 is disposed over the fourth major surfaces of the electronic components or over both the fourth major surfaces of the electronic components and the resin layer. In the exemplary embodiment, the insulating layer 130 is disposed over both the fourth major surfaces of the electronic components and the resin layer. This configuration reduces the likelihood that the mounting board 100 becomes bent by, for example, heat and also eases the stress applied to the electronic components due to the bending of the mounting board 100. Thus, this configuration lowers the probability of characteristic degradation.

It can be considered that to ease the stress applied to the electronic components, the fourth major surfaces of the electronic components are covered by conductivity, or both the fourth major surfaces of the electronic components and the resin layer are covered by conductivity. When a conductive layer is used, there is a possibility that parasitic capacitance can occur between the fourth major surfaces of the electronic components and the conductive layer, thereby degrading communication characteristics. For this reason, in the exemplary embodiment, by using the insulating layer 130, degradation of the communication characteristic is avoided.

The radio-frequency module 1 according to the exemplary embodiment includes the mounting board 100, the electronic components (for example, the controller 70, the switch IC 110, and the second switch 40) and the external connection terminals 200, the resin layer (for example, the second resin layer 125), and the insulating layer 130. The mounting board 100 has the first major surface 101 and the second major surface 102 that are opposite to each other. The electronic components and the external connection terminals 200 are disposed at the second major surface 102 of the mounting board 100. The resin layer at least partially covers the electronic components. The electronic components has the third major surface (for example, the major surface 70*a* of the controller 70 and the major surface 110*a* of the switch IC 110) and the fourth major surface (for example, the major surface 70*b* of the controller 70 and the major surface 110*b* of the switch IC 110) that are opposite to each other. The third major surface of the electronic components is located between the fourth major surfaces of the electronic components and the second major surface 102 of the mounting board 100. The material of the insulating layer 130 includes at least one selected from silicon carbide, silicon dioxide, silicon nitride, and silicon oxynitride. The insulating layer 130 is disposed over the fourth major surfaces of the electronic components or over both the fourth major surfaces of the electronic components and the resin layer.

In this configuration, the insulating layer 130 of the radio-frequency module 1 is disposed over the fourth major surfaces of the electronic components or over both the fourth major surfaces of the electronic components and the resin layer. In the exemplary embodiment, the insulating layer 130 is disposed over both the fourth major surfaces of the electronic components and the resin layer. This configuration reduces the likelihood that the mounting board 100 becomes bent by, for example, heat and also eases the stress applied to the electronic components due to the bending of the mounting board 100. Thus, this configuration lowers the probability of characteristic degradation. Additionally, the material of the insulating layer 130 includes at least one selected from silicon carbide, silicon dioxide, silicon nitride, and silicon oxynitride. Silicon carbide, silicon dioxide, silicon nitride, and silicon oxynitride have relatively high heat dissipation properties and relatively high hardness. Thus, this configuration eases the stress applied to the electronic components and also dissipates heat occurring in the radio-frequency module 1. Silicon carbide and silicon dioxide have relatively low thermal expansion coefficients. Thus, this configuration eases the stress applied to the electronic components.

(5) Modifications

The following describes modifications of the exemplary embodiment. The following modifications can be combined in any manner.

(5.1) First Modification

A radio-frequency module 1A according to a first modification differs from the exemplary embodiment in that the radio-frequency module 1A includes a through via.

In the following, the radio-frequency module 1A according to the first modification will be described with reference to FIG. 5 with a main focus on points that are different from the radio-frequency module 1 of the exemplary embodiment. The same constituent elements as in the exemplary embodiment are denoted by the same reference numerals, and descriptions thereof will not be repeated when appropriate.

Figure 5:
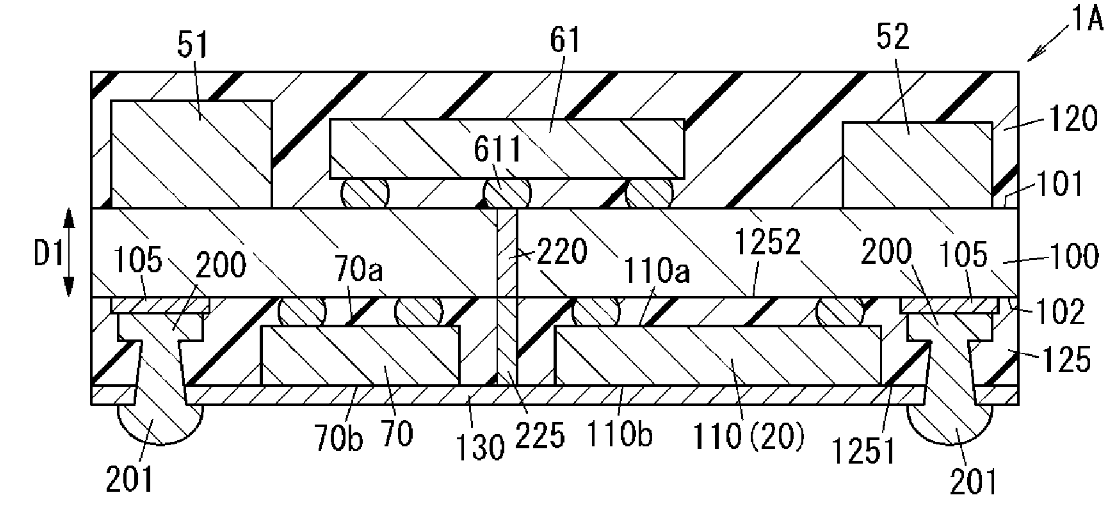
FIG. 5 is a sectional view of a radio-frequency module according to a first modification.

The power amplifier 61 included in the radio-frequency module 1A of the first modification has, as illustrated in FIG. 5, a ground terminal 611 that is grounded.

The mounting board 100 of the radio-frequency module 1A has, as illustrated in FIG. 5, a through via 220 extending through the mounting board 100. The radio-frequency module 1A includes a connection terminal 225 disposed at the second major surface of the mounting board 100. The material of the connection terminal 225 is, for example, metal (for example, copper or a copper alloy). The connection terminal 225 extends through the second resin layer 125. One end of the connection terminal 225 is coupled to the through via 220. The other end of the connection terminal 225 is coupled to the insulating layer 130. This means that the through via 220 is coupled to the insulating layer 130 via the connection terminal 225. In other words, the through via 220 couples the power amplifier 61 and the insulating layer 130.

In the radio-frequency module 1A of the first modification, the insulating layer 130 is disposed over both the fourth major surfaces of the electronic components (for example, the major surface 70*b* of the controller 70 and the major surface 110*b* of the switch IC 110) and the resin layer (the major surface 1251 of the second resin layer 125). As a result, similarly to the exemplary embodiment, this configuration reduces the likelihood that the mounting board 100 becomes bent by, for example, heat and also eases the stress applied to the electronic components due to the bending of the mounting board 100. Thus, this configuration lowers the probability of characteristic degradation. Furthermore, because the insulating layer 130 is coupled to the power amplifier 61 via the through via 220, this configuration more efficiently dissipate heat generated in the power amplifier 61.

(5.2) Second Modification

A radio-frequency module 1 according to a second modification differs from the exemplary embodiment in that the radio-frequency module 1 includes a shield layer.

Figure 6:
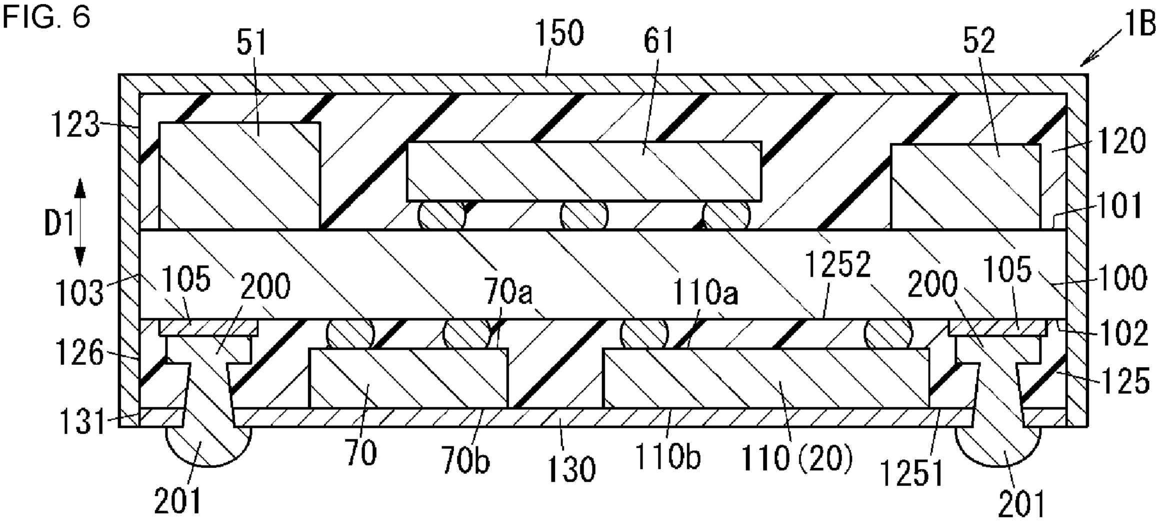
FIG. 6 is a sectional view of a radio-frequency module according to a second modification.

In the following, the radio-frequency module 1B according to the second modification will be described with reference to FIG. 6 with a main focus on points that are different from the radio-frequency module 1 of the exemplary embodiment. The same constituent elements as in the exemplary embodiment are denoted by the same reference numerals, and descriptions thereof will not be repeated when appropriate.

A shield layer 150 is provided over a surface opposite to the mounting board 100 of the first resin layer 120. The shield layer 150 at least partially covers the first resin layer 120 (see FIG. 6). The shield layer 150 is grounded via a ground terminal. The shield layer 150 is electrically conductive. The shield layer 150 has a multilayer structure including a stack of metal layers; but this is not to be interpreted as limiting, and the shield layer 150 may be formed by one metal layer. The metal layer contains one or more kinds of metals.

The shield layer 150 covers a major surface 121 opposite to the mounting board 100 side of the first resin layer 120, an outer side surface 123 of the first resin layer 120, an outer side surface 103 of the mounting board 100, an outer side surface 126 of the second resin layer 125, and an outer side surface 131 of the insulating layer 130. This means that the insulating layer 130 is in contact with the shield layer 150.

In the radio-frequency module 1B of the second modification, the insulating layer 130 is disposed over both the fourth major surfaces of the electronic components (for example, the major surface 70*b* of the controller 70 and the major surface 110*b* of the switch IC 110) and the resin layer (the major surface 1251 of the second resin layer 125). As a result, similarly to the exemplary embodiment, this configuration reduces the likelihood that the mounting board 100 becomes bent by, for example, heat and also eases the stress applied to the electronic components due to the bending of the mounting board 100. Thus, this configuration lowers the probability of characteristic degradation. Furthermore, because the insulating layer 130 is in contact with the shield layer 150, this configuration enhances the heat dissipation capability.

(5.3) Third Modification

A radio-frequency module 1C according to a third modification differs from the exemplary embodiment in that the insulating layer of the radio-frequency module 1C is disposed only over the electronic components.

In the following, the radio-frequency module 1C according to the third modification will be described with reference to FIG. 7 with a main focus on points that are different from the radio-frequency module 1 of the exemplary embodiment. The same constituent elements as in the exemplary embodiment are denoted by the same reference numerals, and descriptions thereof will not be repeated when appropriate.

In the radio-frequency module 1C according to the third modification, the insulating layer 130 is disposed only over the fourth major surfaces of the electronic components disposed at the second major surface 102 of the mounting board 100. This means that the insulating layer 130 of the third modification is not disposed over (the major surface 1251 of) the second resin layer 125.

Figure 7:
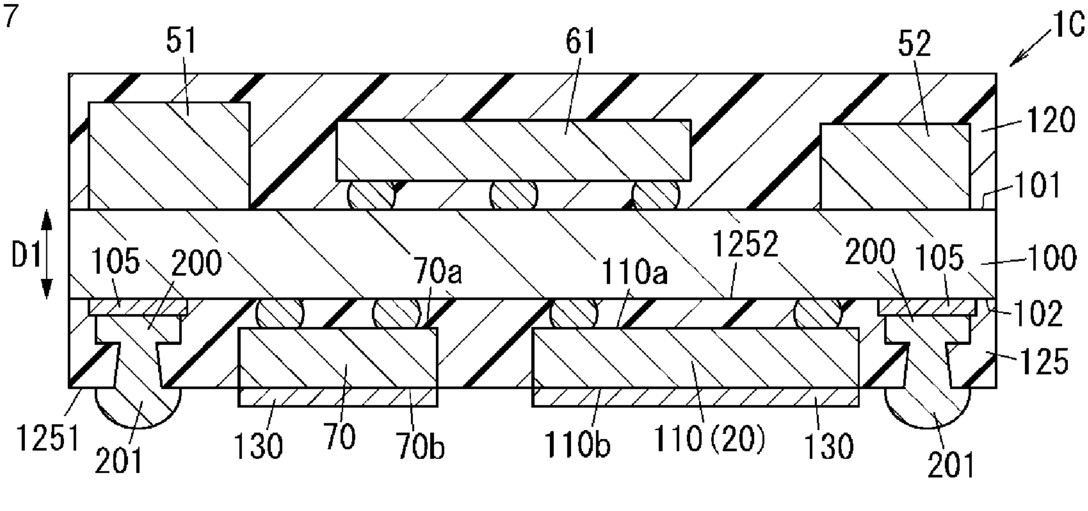
FIG. 7 is a sectional view of a radio-frequency module according to a third modification.

For example, the insulating layer 130 of the third modification is, as illustrated in FIG. 7, disposed over the major surface 70*b* of the controller 70 and the major surface 110*b* of the switch IC 110. The second switch 40 is not illustrated in FIG. 7, but the insulating layer 130 of the third modification is also disposed over a major surface corresponding to the fourth major surface of the second switch 40.

In the third modification, the second resin layer 125 is a non-essential constituent element in the radio-frequency module 1C. This means that the radio-frequency module 1C does not necessarily include the second resin layer 125. When the radio-frequency module 1C does not include the second resin layer 125, the external connection terminals 200 as the multiple external connection terminals 200 are formed by ball bumps. The material of the ball bumps is, for example, gold, copper, or solder.

In the radio-frequency module 1C of the third modification, the insulating layer 130 is disposed only over the fourth major surfaces of the electronic components (for example, the major surface 70*b* of the controller 70 and the major surface 110*b* of the switch IC 110), and the insulating layer 130 is not disposed over the second resin layer 125. This configuration eases the stress applied to the electronic components due to the bending of the mounting board 100 by, for example, heat. Thus, this configuration lowers the probability of characteristic degradation.

(5.4) Fourth Modification

A radio-frequency module 1D according to a fourth modification differs from the exemplary embodiment in that the insulating layer of the radio-frequency module 1D is disposed only over the second resin layer.

In the following, the radio-frequency module 1D according to the fourth modification will be described with reference to FIG. 8 with a main focus on points that are different from the radio-frequency module 1 of the exemplary embodiment. The same constituent elements as in the exemplary embodiment are denoted by the same reference numerals, and descriptions thereof will not be repeated when appropriate.

In the radio-frequency module 1D according to the fourth modification, the insulating layer 130 is disposed covering only the second resin layer 125. This means that the insulating layer 130 of the fourth modification does not cover the fourth major surfaces of the electronic components disposed at the second major surface 102 of the mounting board 100.

Figure 8:
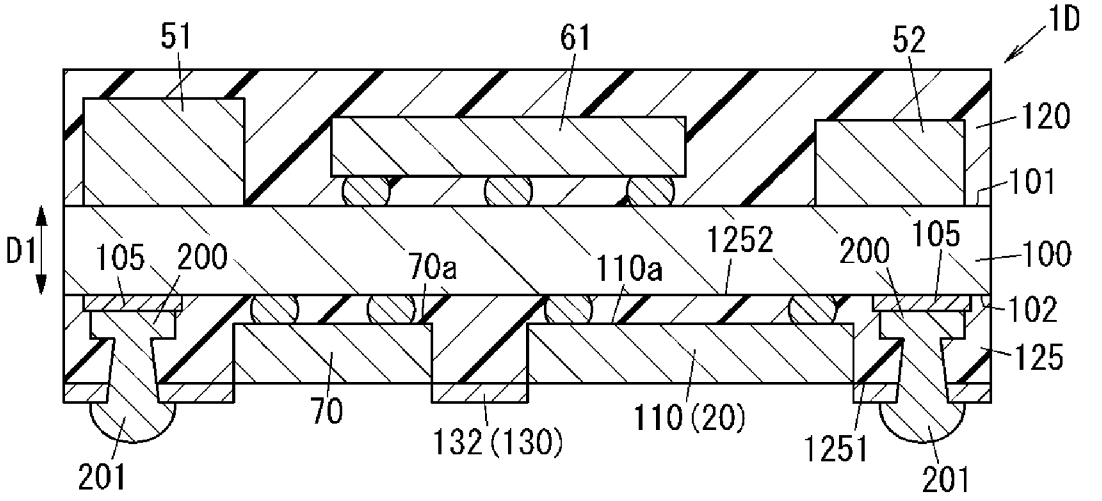
FIG. 8 is a sectional view of a radio-frequency module according to a fourth modification.

For example, the insulating layer 130 of the third modification is, as illustrated in FIG. 8, disposed over the major surface 1251 of the second resin layer 125, but the insulating layer 130 is not disposed over the major surface 70*b* of the controller 70 and the major surface 110*b* of the switch IC 110. In other words, the insulating layer 130 of the third modification is, as illustrated in FIG. 8, disposed covering the major surface 1251 of the second resin layer 125, but the insulating layer 130 is not disposed covering the major surface 70*b* of the controller 70 and the major surface 110*b* of the switch IC 110). The insulating layer 130 of the fourth modification is also not disposed covering a major surface corresponding to the fourth major surface of the second switch 40, which is not illustrated in FIG. 8.

In the radio-frequency module 1D of the fourth modification, the insulating layer 130 is not disposed over the fourth major surfaces of the electronic components disposed at the second major surface 102 of the mounting board 100 (for example, the major surface 70*b* of the controller 70 and the major surface 110*b* of the switch IC 110. This configuration also reduces the likelihood that the mounting board 100 becomes bent by, for example, heat. Thus, this configuration eases the stress applied to the electronic components and lowers the probability of characteristic degradation.

(5.5) Fifth Modification

A radio-frequency module 1E according to a fifth modification differs from the exemplary embodiment in that the power amplifier 61 of the radio-frequency module 1E is disposed at the second major surface 102 of the mounting board 100.

Figure 9:
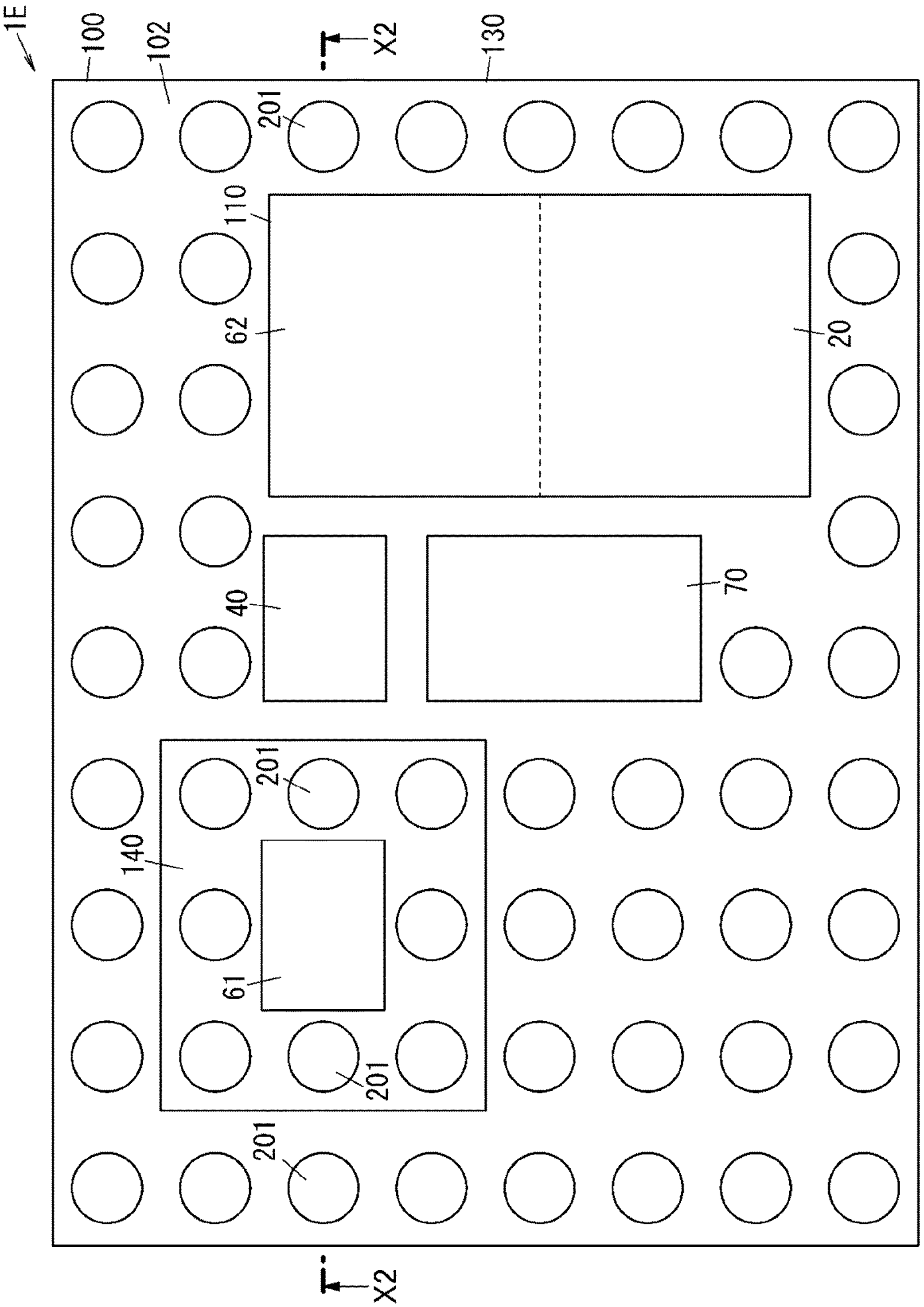
FIG. 9 is a cutaway plan view of electronic components arranged at a second major surface of a mounting board included in a radio-frequency module according to a fifth modification, when viewed from the first major surface side of the mounting board.
Figure 10:
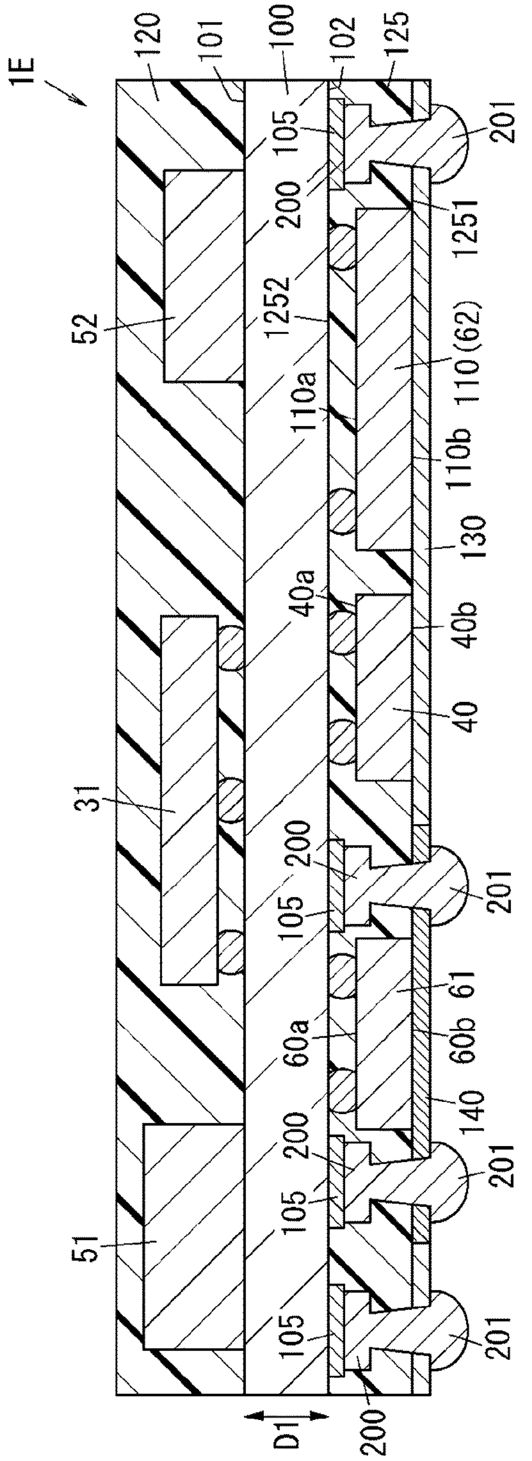
FIG. 10 is a sectional view of the radio-frequency module, taken along line X2-X2 in FIG. 9.

In the following, the radio-frequency module 1E according to the fifth modification will be described with reference to FIGS. 9 and 10 with a main focus on points that are different from the radio-frequency module 1 of the exemplary embodiment. The same constituent elements as in the exemplary embodiment are denoted by the same reference numerals, and descriptions thereof will not be repeated when appropriate.

The radio-frequency module 1E of the fifth modification further includes a ground layer 140. The ground layer 140 is formed by a thin metal film. The ground layer 140 is grounded.

In the radio-frequency module 1E of the fifth modification, the power amplifier 61 is disposed at the second major surface 102 of the mounting board 100. When viewed in plan view in the thickness direction D1 of the mounting board 100, the insulating layer 130 covers the controller 70, the switch IC 110, and the second switch 40, and the ground layer 140 covers the power amplifier 61 (see FIGS. 9 and 10). In FIG. 9, the second resin layer 125 is not illustrated.

The power amplifier 61 has surfaces 61*a* and 61*b* that are opposite to each other in the thickness direction of the power amplifier 61 (the thickness direction D1 of the mounting board 100). The surface 61*a* of the power amplifier 61 is located between the second major surface 102 of the mounting board 100 and the surface 61*b* of the power amplifier 61. The ground layer 140 is disposed over the surface 61*b* of the power amplifier 61.

In the radio-frequency module 1E of the fifth modification, when viewed in plan view in the thickness direction D1 of the mounting board 100, the ground layer 140 covers the power amplifier 61, and the ground layer 140 is coupled to multiple (eight in FIG. 9) metal bumps 201 positioned close to the power amplifier 61. The metal bumps 201 coupled to the ground layer 140 are grounded. The external connection terminals 200 coupled to the metal bumps 201 coupled to the ground layer 140 are ground terminals.

In the radio-frequency module 1E of the fifth modification, the insulating layer 130 is disposed over both the fourth major surfaces of the electronic components (for example, the major surface 70*b* of the controller 70 and the major surface 110*b* of the switch IC 110) and the resin layer (the major surface 1251 of the second resin layer 125). As a result, similarly to the exemplary embodiment, this configuration reduces the likelihood that the mounting board 100 becomes bent by, for example, heat and also eases the stress applied to the electronic components due to the bending of the mounting board 100. Thus, this configuration lowers the probability of characteristic degradation. Furthermore, because the ground layer 140 covers the power amplifier 61, this configuration efficiently dissipate heat generated in the power amplifier 61. Moreover, because the ground layer 140 is coupled to the metal bumps 201 positioned close to the power amplifier 61, this configuration reduces the possibility that signals outputted from the power amplifier 61 can pass into the other electronic components.

(5.6) Sixth Modification

The material of the insulating layer 130 includes at least one selected from silicon carbide, silicon dioxide, silicon nitride, and silicon oxynitride, but this configuration should not be interpreted as limiting. The material of the insulating layer 130 may be made of a resin that is harder than the second resin layer 125. Alternatively, the material of the insulating layer 130 may be a insulating film.

When the insulating layer 130 is made of a resin, the material of the insulating layer 130 may be either the same as or different from the material of the second resin layer 125. When the material of the insulating layer 130 is different from the material of the second resin layer 125, a material harder than the material of the second resin layer 125 is preferable. When the material of the insulating layer 130 is different from the material of the second resin layer 125, a material having a thermal conductivity higher than the material of the second resin layer 125 is preferable.

Conclusion

As described above, a radio-frequency module (1; 1A; 1B; 1C; 1D; 1E) of a first aspect includes a mounting board (100), an electronic components (for example, the controller 70, the switch IC 110, and the second switch 40) and an external connection terminal (200), a resin layer (for example, the second resin layer 125), and an insulating layer (130). The mounting board (100) has a first major surface (101) and a second major surface (102) that are opposite to each other. The electronic component is disposed at the second major surface (102) of the mounting board (100). The external connection terminal (200) is disposed at the second major surface (102) of the mounting board (100). The resin layer at least partially covers the electronic component. The electronic component has a third major surface (for example, the major surface 70*a* of the controller 70 and the major surface 110*a* of the switch IC 110) and a fourth major surface (for example, the major surface 70*b* of the controller 70 and the major surface 110*b* of the switch IC 110) that are opposite to each other. The third major surface of the electronic component is located between the fourth major surface of the electronic component and the second major surface (102) of the mounting board (100). The insulating layer (130) is harder than the resin layer. The insulating layer (130) is disposed over the fourth major surface of the electronic component or over both the fourth major surface of the electronic component and the resin layer.

In this configuration, the insulating layer (130) of the radio-frequency module (1; 1A; 1B; 1C; 1D; 1E) is disposed over the fourth major surfaces of the electronic components or over both the fourth major surfaces of the electronic components and the resin layer. This configuration eases the stress applied to the electronic components. Thus, this configuration lowers the probability of characteristic degradation.

A radio-frequency module (1; 1A; 1B; 1C; 1D; 1E) of a second aspect includes a mounting board (100), an electronic component (for example, the controller 70, the switch IC 110, and the second switch 40) and an external connection terminal (200), a resin layer (for example, the second resin layer 125), and an insulating layer (130). The mounting board (100) has a first major surface (101) and a second major surface (102) that are opposite to each other. The electronic component and the external connection terminal (200) are disposed at the second major surface (102) of the mounting board (100). The resin layer at least partially covers the electronic component. The electronic component has a third major surface (for example, the major surface 70*a* of the controller 70 and the major surface 110*a* of the switch IC 110) and a fourth major surface (for example, the major surface 70*b* of the controller 70 and the major surface 110*b* of the switch IC 110) that are opposite to each other. The third major surface of the electronic components is located between the fourth major surface of the electronic component and the second major surface (102) of the mounting board (100). The material of the insulating layer (130) includes at least one selected from silicon carbide, silicon dioxide, silicon nitride, and silicon oxynitride. The insulating layer (130) is disposed over the fourth major surface of the electronic component or over both the fourth major surface of the electronic component and the resin layer.

In this configuration, the insulating layer (130) of the radio-frequency module (1; 1A; 1B; 1C; 1D; 1E) is disposed over the fourth major surfaces of the electronic components or over both the fourth major surfaces of the electronic components and the resin layer. This configuration eases the stress applied to the electronic components. Thus, this configuration lowers the probability of characteristic degradation. Additionally, the material of the insulating layer (130) includes at least one selected from silicon carbide, silicon dioxide, silicon nitride, and silicon oxynitride. Silicon carbide, silicon dioxide, silicon nitride, and silicon oxynitride have relatively high heat dissipation properties and relatively high hardness. Thus, this configuration eases the stress applied to the electronic components and also dissipates heat occurring in the radio-frequency module 1. Silicon carbide and silicon dioxide have relatively low thermal expansion coefficients. Thus, this configuration eases the stress applied to the electronic components.

In the radio-frequency module (1; 1A; 1B; 1C; 1D; 1E) of a third aspect, with respect to the first aspect, the material of the insulating layer (130) includes at least one selected from silicon carbide, silicon dioxide, silicon nitride, and silicon oxynitride.

Silicon carbide, silicon dioxide, silicon nitride, and silicon oxynitride have relatively high heat dissipation properties and relatively high hardness. Thus, this configuration eases the stress applied to the electronic components and also dissipates heat occurring in the radio-frequency module 1. Silicon carbide and silicon dioxide have relatively low thermal expansion coefficients. Thus, this configuration eases the stress applied to the electronic components.

In the radio-frequency module (1; 1A; 1B; 1C; 1D; 1E) of a fourth aspect, with respect to the first aspect, the material of the insulating layer (130) is harder than the resin layer.

When a resin is used as the insulating layer (130), this configuration eases the stress applied to the electronic components and lowers the probability of characteristic degradation.

In the radio-frequency module (1; 1A; 1B; 1C; 1D; 1E) of a fifth aspect, with respect to any of the first to fourth aspects, in the thickness direction (D1) of the mounting board (100), the height (for example, h1) from the second major surface (102) of the mounting board (100) to the fourth major surfaces of the electronic components is the same as the height (h2) from the second major surface (102) of the mounting board (100) to the fifth major surface (for example, the major surface 1251) opposite to the mounting board (100) of the resin layer.

In this configuration, the fourth major surfaces of the electronic components are flush with the resin layer, and as a result, the insulating layer (130) can be easily disposed.

In the radio-frequency module (1; 1A; 1B; 1C; 1D; 1E) of a sixth aspect, with respect to any of the first to fifth aspects, the external connection terminal (200) is disposed at the second major surface (102) of the mounting board (100). When viewed in plan view in the thickness direction (D1) of the mounting board (100), the external connection terminal (200) overlaps the insulating layer (130).

In this configuration, when viewed in plan view in the thickness direction (D1) of the mounting board (100), the external connection terminals (200) overlap the insulating layer (130). As a result, when, for example, solder is coupled to the external connection terminals (200), the solder is coupled to the insulating layer (130). This prevents the radio-frequency module (1; 1A; 1B; 1C; 1D; 1E) from becoming short-circuited.

The radio-frequency module (1; 1A; 1B; 1C; 1D; 1E) of a seventh aspect, with respect to any of the first to fifth aspects, further includes a metal bump (201). The metal bump (201) is coupled to the external connection terminal (200). The insulating layer (130) is in contact with the metal bumps.

In this configuration, the metal bump (201) coupled to the external connection terminal (200) is coupled to the insulating layer (130). This prevents the radio-frequency module (1; 1A; 1B; 1C; 1D; 1E) from becoming short-circuited.

In the radio-frequency module (1; 1A; 1B; 1C; 1D; 1E) of an eighth aspect, with respect to any of the first to seventh aspects, the thermal electrical conductivity of the insulating layer (130) is higher than the thermal electrical conductivity of the resin layer.

This configuration enhances the heat dissipation capability.

The radio-frequency module (1; 1A; 1B; 1C; 1D; 1E) of a ninth aspect, with respect to any of the first to eighth aspects, further includes a power amplifier (61). The power amplifier (61) is disposed at the first major surface (101) of the mounting board (100). The mounting board (100) includes a through via (220) coupling the power amplifier (61) and the insulating layer (130).

This configuration efficiently dissipates heat generated in the power amplifier (61).

In the radio-frequency module (1; 1A; 1B; 1C; 1D; 1E) of a tenth aspect, with respect to any of the first to eighth aspects, the insulating layer (130) is disposed only over the fourth major surfaces of the electronic components but is not disposed over the resin layer.

This configuration eases the stress applied to the electronic components due to the bending of the mounting board 100 by, for example, heat and lowers the probability of characteristic degradation.

In the radio-frequency module (1; 1A; 1B; 1C; 1D; 1E) of an eleventh aspect, with respect to any of the first to ninth aspects, the insulating layer (130) is disposed over both the fourth major surfaces of the electronic components and the resin layer.

This configuration reduces the likelihood that the mounting board (100) becomes bent by, for example, heat and also eases the stress applied to the electronic components due to the bending of the mounting board (100). Thus, this configuration lowers the probability of characteristic degradation.

The radio-frequency module (1; 1A; 1B; 1C; 1D; 1E) of a twelfth aspect, with respect to the eleventh aspect, further includes a shield layer (150). The shield layer (150) covers the first resin layer (120) disposed on the first major surface (101) side with respect to the mounting board (100), the outer side surface (103) of the mounting board (100), and the second resin layer (125) that is the resin layer at least partially covering the electronic component disposed at the second major surface (102) of the mounting board (100). The insulating layer (130) is in contact with the shield layer (150).

Because the insulating layer 130 is in contact with the shield layer 150, this configuration enhances the heat dissipation capability.

A communication device (500) of a thirteenth aspect includes the radio-frequency module (1; 1A; 1B; 1C; 1D; 1E) of any of the first to twelfth aspects and a signal processing circuit (501). The signal processing circuit (501) is configured to process a radio-frequency signal transferred or to be transferred through the radio-frequency module (1; 1A; 1B; 1C; 1D; 1E).

This configuration eases the stress applied to the electronic component. Thus, this configuration lowers the probability of characteristic degradation.

REFERENCE SIGNS LIST

1, 1A, 1B, 1C, 1D, 1E radio-frequency module
10 antenna terminal
20 first switch
21 common terminal
22, 23 selection terminal
31 first transmit filter
32 second transmit filter
33 first receive filter
34 second receive filter
40 second switch
41 third switch
42 fourth switch
51 first matching circuit
52 second matching circuit
61 power amplifier
62 low-noise amplifier
70 controller
70*a* major surface (third major surface)
70*b* major surface (fourth major surface)
81 signal input terminal
82 signal output terminal
83 control terminal
100 mounting board
101 first major surface
102 second major surface
103 outer side surface
105 pad
110 switch IC
110*a* major surface (third major surface)
110*b* major surface (fourth major surface)
120 first resin layer
121 major surface
123 outer side surface
125 second resin layer
126 outer side surface
130 insulating layer
131 outer side surface
140 ground layer
150 shield layer
200 external connection terminal
201 metal bump
210 hole
220 through via
225 connection terminal
411 common terminal
412, 413 selection terminal
421 common terminal
422, 423 selection terminal
500 communication device
501 signal processing circuit
502 RF signal processing circuit

503 baseband signal processing circuit
510 antenna
611 ground terminal
1251 major surface (fifth major surface)
1252 major surface
D1 thickness direction
h1, h2 height

The invention claimed is:

1. A radio-frequency module comprising:

a mounting board having a first major surface opposite to a second major surface;

an electronic component and an external connection terminal that are disposed at the second major surface of the mounting board;

a resin layer at least partially covering the electronic component; and an insulating layer, wherein the electronic component has a third major surface opposite to a fourth major surface, the third major surface of the electronic component is located between the fourth major surface of the electronic component and the second major surface of the mounting board, the insulating layer is harder than the resin layer, and the insulating layer is disposed over the fourth major surface of the electronic component or disposed over both the fourth major surface of the electronic component and the resin layer, wherein, in a thickness direction of the mounting board, a height from the second major surface of the mounting board to the fourth major surface of the electronic component is the same as a height from the second major surface of the mounting board to a fifth major surface of the resin layer, the fifth major surface being opposite to the mounting board.

2. A radio-frequency module comprising:

a mounting board having a first major surface opposite to a second major surface;

an electronic component and an external connection terminal that are disposed at the second major surface of the mounting board;

a resin layer at least partially covering the electronic component; and an insulating layer, wherein the electronic component has a third major surface opposite to a fourth major surface, the third major surface of the electronic component is located between the fourth major surface of the electronic component and the second major surface of the mounting board, a material of the insulating layer includes at least one selected from silicon carbide, silicon dioxide, silicon nitride, and silicon oxynitride, and the insulating layer is disposed over the fourth major surface of the electronic component or disposed over both the fourth major surface of the electronic component and the resin layer, wherein, in a thickness direction of the mounting board, a height from the second major surface of the mounting board to the fourth major surface of the electronic component is the same as a height from the second major surface of the mounting board to a fifth major surface of the resin layer, the fifth major surface being opposite to the mounting board.

3. The radio-frequency module according to claim 1, wherein a material of the insulating layer includes at least one selected from silicon carbide, silicon dioxide, silicon nitride, and silicon oxynitride.

4. The radio-frequency module according to claim 1, wherein a material of the insulating layer is a resin that is harder than the resin layer.

5. The radio-frequency module according to claim 1, wherein when viewed in plan view in a thickness direction of the mounting board, the external connection terminal overlaps the insulating layer.

6. The radio-frequency module according to claim 1, further comprising:

a metal bump coupled to the external connection terminal, wherein the insulating layer is in contact with the metal bump.

7. The radio-frequency module according to claim 1, wherein the insulating layer is higher than the resin layer with respect to thermal electrical conductivity.

8. The radio-frequency module according to claim 1, further comprising:

a power amplifier disposed at the first major surface of the mounting board, wherein the mounting board includes a through via that connects the power amplifier and the insulating layer.

9. The radio-frequency module according to claim 1, wherein the insulating layer is disposed over the fourth major surface of the electronic component but is not disposed over the resin layer.

10. The radio-frequency module according to claim 1, wherein the insulating layer is disposed over both the fourth major surface of the electronic component and the resin layer.

11. The radio-frequency module according to claim 10, further comprising:

a shield layer covering a first resin layer disposed on a first major surface side with respect to the mounting board, an outer side surface of the mounting board, and a second resin layer that is the resin layer at least partially covering the electronic component disposed at the second major surface of the mounting board, wherein the insulating layer is in contact with the shield layer.

12. A communication device comprising:

the radio-frequency module according to claim 1; and a signal processing circuit configured to process a radio-frequency signal transmitted or to be transmitted through the radio-frequency module.

13. The radio-frequency module according to claim 1, wherein the mounting board is a low temperature co-fired ceramics (LTCC) substrate.

14. The radio-frequency module according to claim 1, wherein the mounting board is a high temperature co-fired ceramics (HTCC) substrate.

15. The radio-frequency module according to claim 1, wherein the mounting board is a multilayer substrate.

16. The radio-frequency module according to claim 15, wherein the multilayer substrate is made of resin.

17. The radio-frequency module according to claim 15, wherein the multilayer substrate includes one or more dielectric layers and one or more conductive layer.

18. The radio-frequency module according to claim 17, wherein the multilayer substrate is a ceramic substrate.

19. The radio-frequency module according to claim 17, wherein the one or more conductive layers include copper.

* * * * *